United States Patent [19]

Satoh et al.

[11] Patent Number: 4,735,114
[45] Date of Patent: Apr. 5, 1988

[54] CONTROL SYSTEM FOR VEHICLE WITH ENGINE AND CONTINUOUSLY VARIABLE TRANSMISSION

[75] Inventors: Hajime Satoh, Hatano; Naohiko Inoue, Yokohama, both of Japan

[73] Assignee: Nissan Motor Co., Ltd., Yokohama, Japan

[21] Appl. No.: 914,520

[22] Filed: Oct. 2, 1986

Related U.S. Application Data

[63] Continuation of Ser. No. 587,892, Mar. 9, 1984.

[30] Foreign Application Priority Data

Mar. 11, 1983 [JP] Japan .................................. 58-39085
Oct. 11, 1983 [JP] Japan .................................. 58-188473

[51] Int. Cl.⁴ ............................................. B60K 41/14
[52] U.S. Cl. ................................... 74/866; 74/860
[58] Field of Search ............... 74/785, 859, 860, 861, 74/865, 866; 192/3 T; 251/69

[56] References Cited

U.S. PATENT DOCUMENTS

| | | | |
|---|---|---|---|
| 3,113,473 | 12/1963 | Morlen | 74/785 |
| 3,527,118 | 9/1970 | Jenson et al. | 74/626 |
| 4,107,776 | 8/1978 | Beale | 364/431 |
| 4,281,567 | 8/1981 | Maurer | 74/866 |
| 4,287,969 | 9/1981 | Misumi et al. | 74/785 X |
| 4,291,594 | 9/1981 | Baudoin | 74/857 |
| 4,343,385 | 8/1982 | Kosuda et al. | 192/0.02 |
| 4,360,089 | 10/1982 | Matsui et al. | 192/2 |
| 4,365,152 | 12/1982 | Gergek | 250/231 |
| 4,367,805 | 1/1983 | Totani et al. | 180/179 |
| 4,458,560 | 7/1984 | Frank et al. | 74/865 X |
| 4,507,986 | 4/1985 | Okamura et al. | 74/866 |

FOREIGN PATENT DOCUMENTS

| | | |
|---|---|---|
| 0044202 | 1/1982 | European Pat. Off. . |
| 0059426 | 9/1982 | European Pat. Off. . |
| 0061735 | 10/1982 | European Pat. Off. . |
| 0073475 | 3/1983 | European Pat. Off. . |
| 56-107925 | 8/1981 | Japan . |
| 56-132428 | 10/1981 | Japan . |
| 57-90450 | 6/1982 | Japan . |
| 58-25853 | 5/1983 | Japan . |
| 8201519 | 5/1982 | PCT Int'l Appl. . |
| 1556888 | 11/1979 | United Kingdom . |
| 2057605 | 4/1981 | United Kingdom . |

OTHER PUBLICATIONS

European Search Report.

Primary Examiner—Lawrence J. Staab
Assistant Examiner—Dwight G. Diehl
Attorney, Agent, or Firm—Schwartz, Jeffery, Schwaab, Mack, Blumenthal & Evans

[57] ABSTRACT

A control strategy is disclosed wherein a desired driving force is determined based on sensed input signals and a throttle actuator and a reduction ratio actuator are actuated so that the engine can produce the desired driving force without deviating from the predetermined best fuel economy curve.

10 Claims, 9 Drawing Sheets

CONTROL SYSTEM FOR VEHICLE WITH ENGINE AND CONTINUOUSLY VARIABLE TRANSMISSION

This application is a continuation of application Ser. No. 587,892, filed Mar. 9, 1984.

BACKGROUND OF THE INVENTION

The present invention relates to a control system for a vehicle having an engine and a continuously variable transmission.

As a conventional control system for a continuously variable transmission, there is, for example, one as disclosed in Laid-Open Japanese Patent Application 57-90450 entitled "CONTROL SYSTEM FOR VEHICULAR AUTOMATIC TRANSMISSION." In this conventional control system, a desired reduction ratio is determined from a predetermined optimum reduction ratio characteristic which is predetermined based on a running load, an engine speed and a vehicle speed, and then the reduction ratio in the continuously variable transmission is controlled so as to establish this desired reduction ratio. However, according to this control system, the vehicle is likely to spin and plunge into a dangerous state if the driver depresses the accelerator pedal rapidly to its full stroke in a certain running state because the engine produces its full power output irrespective of the vehicle speed. Another problem stems from the fact that the response in shifting the reduction ratio in the continuously variable transmission to a change in the desired reduction ratio is slow as compared to the response of the engine to a change in throttle opening degree that indicates running load. As a result, the operating state of the vehicle deviates from the optimum reduction ratio characteristic by an amount corresponding to the shifting delay while the throttle opening degree is changing. Therefore, the operating state of the engine can not be controlled desired.

SUMMARY OF THE INVENTION

According to the present invention, there is provided a control system for a vehicle having an engine and a continuously variable transmission which controls the engine and the transmission such that the engine can produce a driving force appropriate for an operating condition of the vehicle while always operating on the best fuel economy curve without any deviation therefrom.

In a control system according to the present invention, a desired driving force to be given to a driving wheel is determined as a function of the depression degree of an accelerator pedal and a vehicle speed, a desired engine power output is given by performing a computation based on the desired driving force and the vehicle speed, a desired throttle opening degree and a desired engine speed are determined which accomplish the desired engine power output, and the actual throttle opening degree and the actual reduction ratio are adjusted to the desired throttle opening degree and reduction ratio, respectively.

According to another aspect of the present invention, a control system comprises a throttle actuator of the type having a throttle valve, a return spring, a motor and a driving system between the throttle valve and the motor, wherein the driving system eliminates the influence of the return spring on the motor when the motor operates normally, but allows the return spring to play a role in biasing the throttle valve toward a closed position thereof when the motor fails to operate normally.

DETAILED DESCRIPTION OF THE INVENTION

Figure 1:
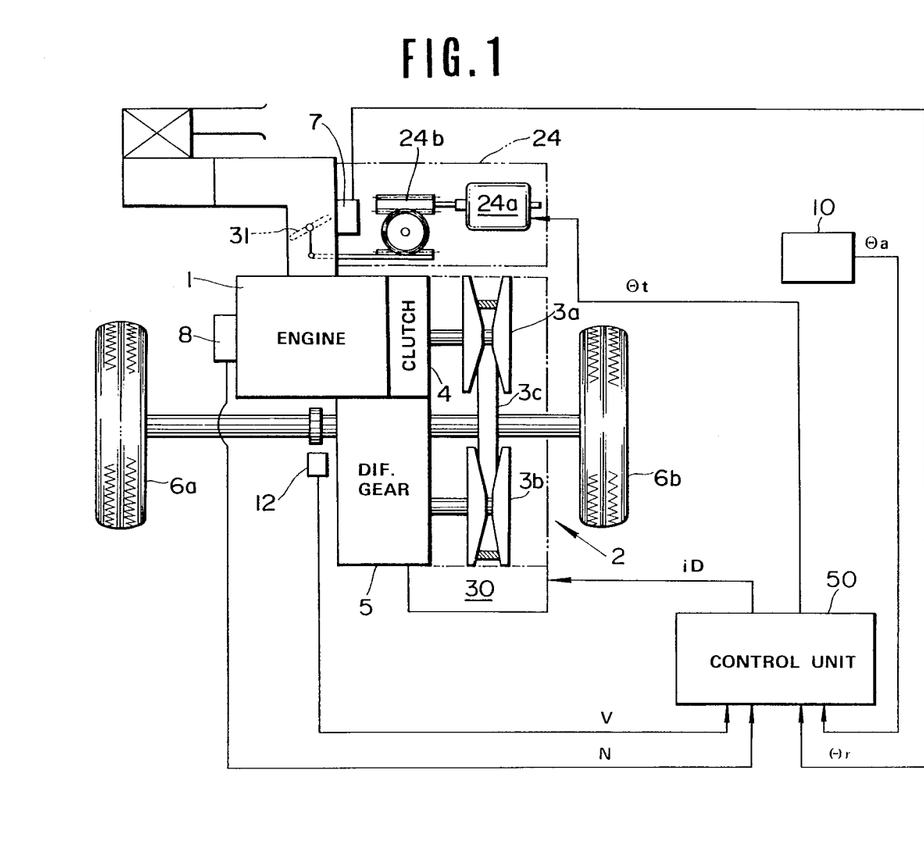
FIG. 1 is a diagram illustrating a vehicle having an engine, a continuously variable transmission and a control system according to the present invention.

Referring to FIG. 1, an automotive vehicle comprises an engine 1 having a throttle valve 31 of a carburetor and a continuously variable transmission 2. The continuously variable transmission 2 has a pulley unit including a pair of pulleys 3a, 3b interconnected by a V-belt 3. The pulley unit is connected to the engine via a clutch 4 and to a differential gear 5 connected to a pair of driving wheels 6a, 6b. The pulley ratio, i.e., a reduction ratio is controlled by an actuator 30. The clutch may take the form of a torque converter or a centrifugal clutch or a hydraulic fluid operated clutch.

The continuously variable transmission using a torque converter is disclosed in a co-pending U.S. patent application Ser. No. 362,489 filed on Mar. 26, 1982, which U.S. petent application has a corresponding European patent application No. 82102530.1, filed on Mar. 25, 1982. This European patent application was published on Oct. 6, 1982 in European patent Bulletin No. 82/40 under the publication No. 0061735.

The continuously variable transmission using a centrifugal clutch is disclosed in a co-pending U.S. patent application Ser. No. 411,987 filed on Aug. 26, 1982, which U.S. patent application has a corresponding European patent application No. 82107823.5 filed on Aug. 25, 1982 and published on Mar. 9, 1983.

The continuously variable transmission using a hydraulic fluid operated clutch is disclosed in a co-pending U.S. patent application Ser. No. 543,838 filed on Oct. 21, 1983, which U.S. patent application has a corresponding European patent application No. 83110546.5 filed on Oct. 21, 1983.

Referring back to FIG. 1, a control unit 50 is fed with a signal $\theta a$ indicative of the depression degree of an accelerator, not shown, from an accelerator sensor 10 which is known per se., and also with a signal V indicative of the vehicle speed from a vehicle speed sensor 12.

Under the control of the control unit 50, a throttle actuator 24 adjusts the opening degree of the throttle valve 31 to a desired or target throttle opening value indicated by an output signal θt and the reduction ratio is adjusted by the reduction ratio actuator 30 to a desired or target reduction ratio value indicated by an output signal iD. For feedback control, the throttle opening degree of the throttle valve 31 is sensed by a throttle position sensor 7 which is known per se. and generates a signal θr indicative of the actual throttle opening degree, and the actual reduction ratio is given by an arithmetical operation based on the vehicle speed V and an engine speed N from an engine speed sensor 8 which is known per se. The throttle actuator 24 includes a servo motor 24a and a gearing 24b.

Figure 2:
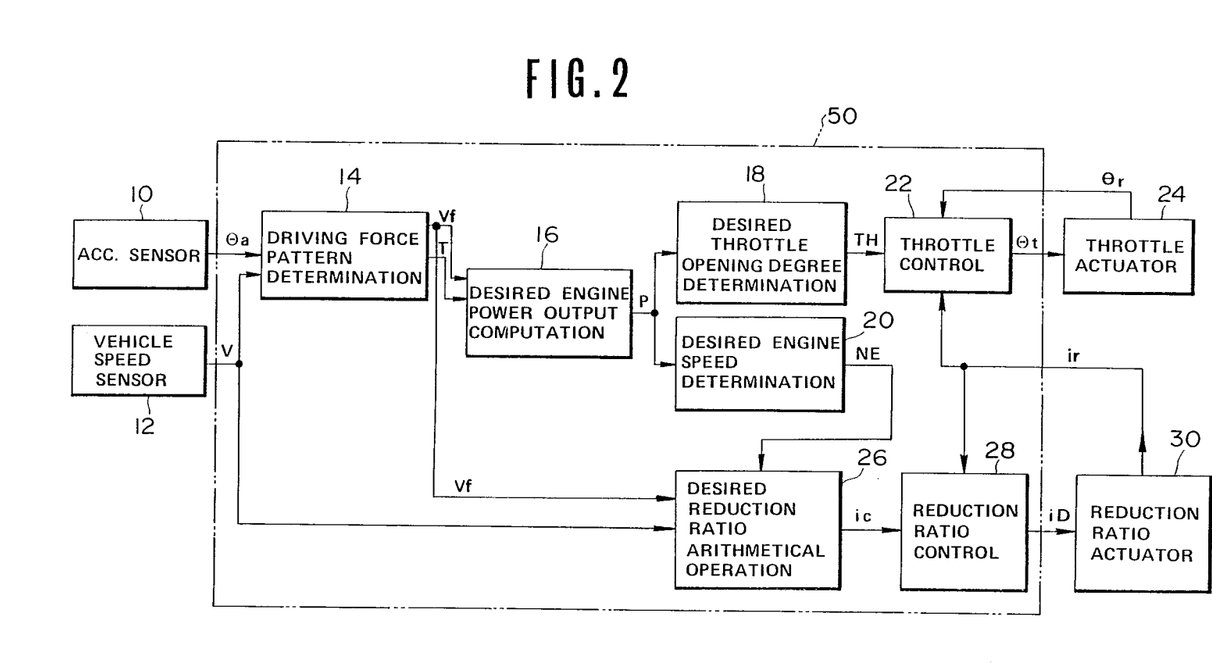
FIG. 2 is a block diagram of the control system shown in FIG. 1.

Referring to FIG. 2, it is described how the control unit 50 controls the throttle actuator 24 and the reduction ratio actuator 30.

Figure 6:
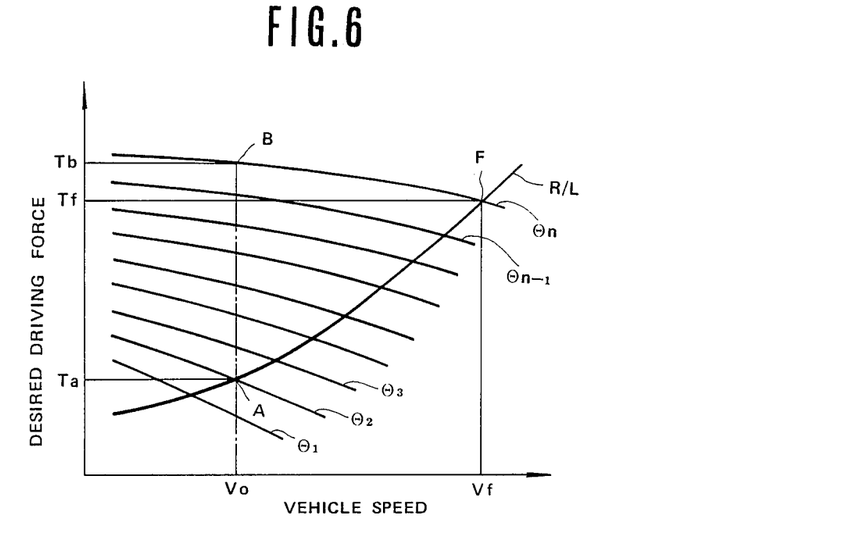
FIG. 6 is a graph showing various patterns in which the desired driving force varies versus vehicle speed, each desired driving force pattern being for the same depression degree of an accelerator pedal.

The signal θa from the accelerator sensor 10 and the signal V from the vehicle speed sensor 12 are fed to a driving force pattern determining block 14 where a desired driving force to be supplied to the driving wheels of the vehicle and a final vehicle speed Vf are determined by a table lock-up FIG. 6 using the vehicle speed V and the accelerator pedal depression degree (θ1, θ2, . . . , θn). The block 14 generates a signal T indicative of the desired driving force and a signal Vf indicative of the final vehicle speed. In FIG. 6, the greater the accelerator pedal depression degree, the greater the desired driving force becomes, and the higher the vehicle speed, the less the desired driving force becomes. This graph represents the driving force/vehicle speed characteristic designed to give a desired running characteristic for a certain automotive vehicle. The solid line curve R/L (road load) is added to the graph. The desired driving force indicative signal T from the driving force pattern determining block 14 and the final desired vehicle speed indicative signal Vf are fed to a desired engine power output computing block 16.

The desired engine power output computing block 16 performs an arithmetical operation to provide a desired engine power output with which the driving force indicated by the desired driving force signal T is given with the best fuel economy. The block 16 generates a signal P indicative of the desired engine power output. The desired engine power output indicative signal P is fed to a desired throttle opening determining block 18 and also to a desired engine speed determining block 20.

The desired throttle opening degree determining block 18 performs an arithmetical operation to provide a desired throttle opening degree for the engine power output indicated by the desired engine power output signal P. The desired engine speed determining block 20 performs an arithmetical operation to provide a desired engine speed for the engine power output indicated by the desired engine power output signal P. The block 18 generates a signal TH indicative of the desired throttle opening degree and the block 20 generates a signal NE indicative of the desired engine speed. The desired throttle opening degree indicative signal TH from the desired throttle opening degree determining block 18 is fed to a throttle control block 22.

The throttle control block 22 produces a throttle opening degree command signal θt, which is used for driving the throttle actuator 24, in response to the desired throttle opening degree signal TH. From the throttle actuator 24, signal θr indicative of the actual throttle opening degree is fed back to the throttle control block 22. Also fed to the throttle control block 22 is signal ir indicative of a later actual reduction ratio. In accordance with this input signal ir, the throttle opening degree command signal θt is corrected.

The desired engine speed signal NE from the desired engine speed determining block 20 is fed to a desired reduction ratio arithmetical operation block D26. Also fed to this block 26 is the final desired vehicle speed signal Vf from the driving force pattern determine block 14. In this block 26, an arithmetical operation based on the signals NE and V is performed to provide a desired reduction ratio for the desired engine speed indicated by the signal NE. A signal ic indicative of the desired reduction ratio generated by the desired reduction ratio arithmetical operation block 26 is fed to a reduction ratio control block 28.

The reduction ratio control block 28 produces a reduction ratio command signal iD to be supplied to the reduction ratio actuator 30 so that the desired reduction ratio obtained by the arithmetical operation in the desired reduction ratio arithmetical operation block 26 is established. The reduction ratio actuator 30 operates in response to the reduction ratio command signal iD so as to control the reduction ratio in the continuously variable transmission 2 as commanded. For feedback control, the signal ir indicative of the actual reduction ratio is fed to the reduction ratio control block 28. As mentioned before, this signal ir is fed to the throttle control block 22 also.

Figure 3:
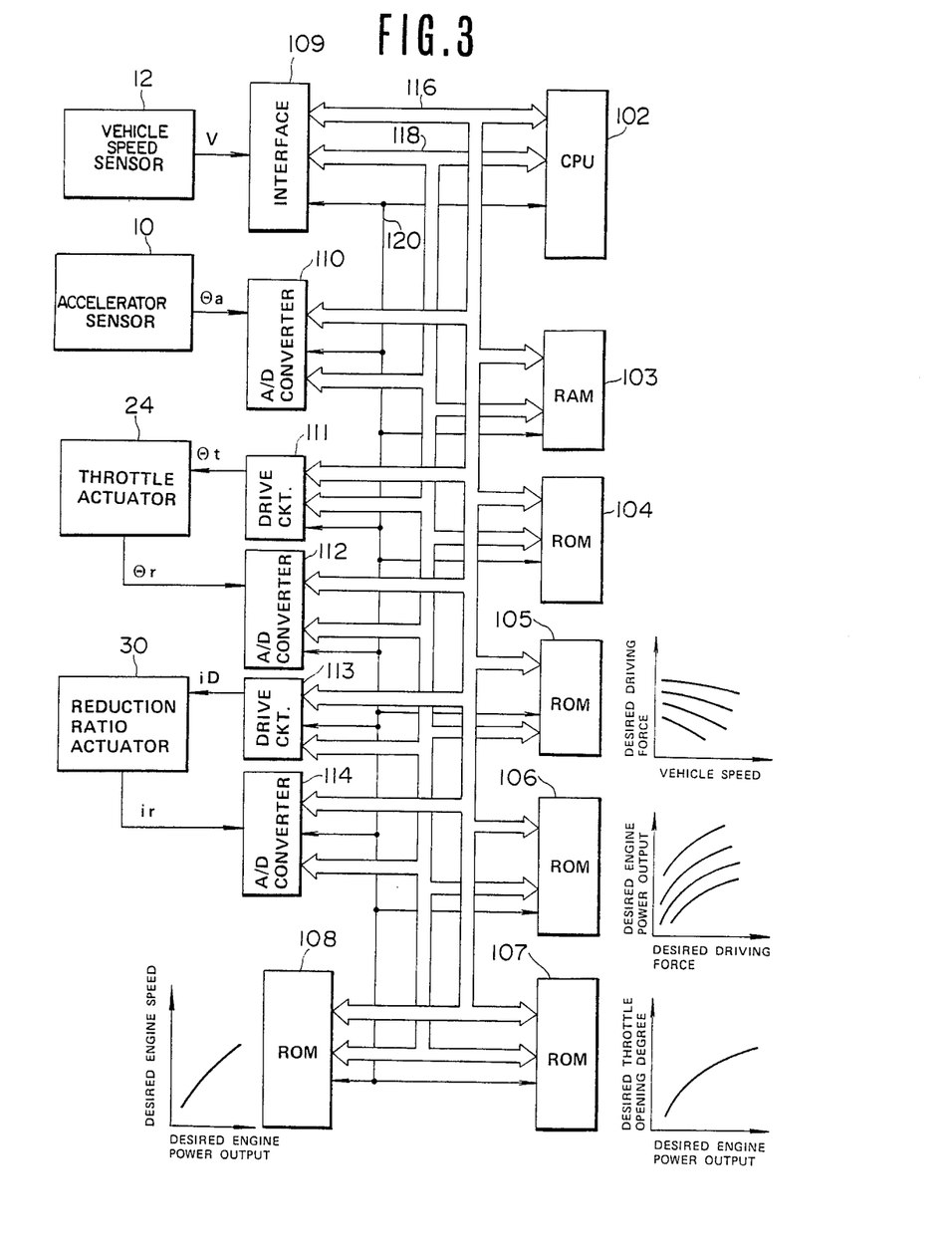
FIG. 3 is a computerized configuration of the control system shown in FIG. 1.
Figure 4:
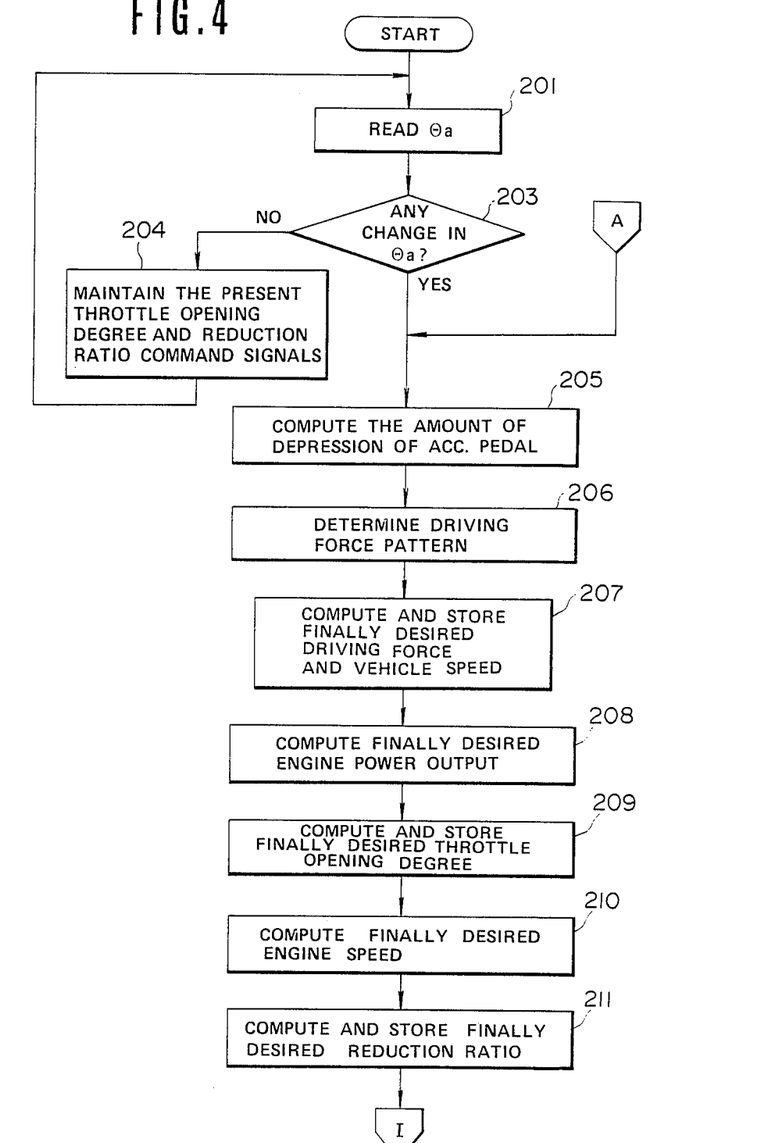
FIGS. 4 and 5 illustrate a flowchart of a program carried out by the micocomputer shown in FIG. 3.
Figure 5:
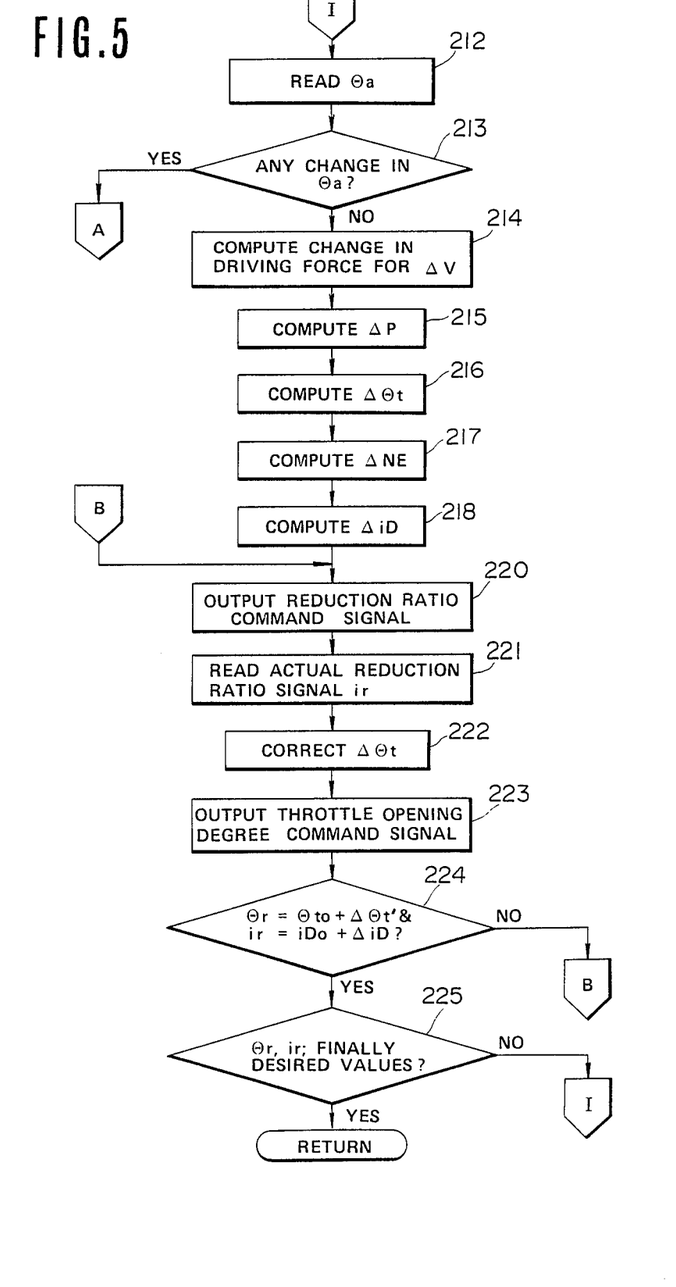

Referring to FIG. 3, a computer-based configuration of the control system shown in FIG. 1 is described, which comprises: a CPU 102 where signals are processed by arithmetical operation; a RAM 103 where the arithmetical results are temporarily stored; a ROM 104 where the control program shown in FIGS. 4 and 5 is stored; a ROM 105 where the map is stored which is in the form of a graph representing the desired driving force/vehicle speed characteristic for different accelerator depression degrees (see FIG. 6); a ROM 106 where the map is stored which is in the form of a graph representing the desired engine power output versus the desired driving force characteristic which satisfies the best fuel economy curve for different vehicle speeds; a ROM 107 where the map is stored which is in the form of a graph representing the desired throttle opening versus the desired engine power output characteristic which satisfies the best fuel economy curve; a ROM 108 where the map is stored which is in the form of a graph representing the relationship between the desired engine power output on the best fuel economy curve and the desired engine speed which gives the given desired engine power output; an interface 109 where the vehicle speed signal V is processed for conversion to a digital signal; an AD converter 110 where the accelerator depression degree signal θa is converted into a digital signal; a drive circuit 111 which produces the throttle opening degree command signal θt for driving the throttle actuator 24; an AD converter 112 where the signal θr indicative of the actual throttle opening degree is converted into a digital signal; a drive circuit 113 which produces the reduction ratio command signal iD for driving the reduction ratio actuator 30; and an AD converter 114 where the signal ir indicative of the actual reduction ratio is converted into a digital signal, and these components are interlinked via an address bus 116, a data bus 118 and a control bus 120 as shown in FIG. 3.

Referring to the flowchart shown in FIGS. 4 and 5, the control strategy stored in the ROM 104 is explained. The program begins with a step 201 where the signal θa is read from the accelerator sensor 10, and a determination is made whether the signal θa has changed (in a step 203). If the signal θa has not changed, a step 204 is executed where the present throttle opening degree command signal θt and the present reduction ratio command signal iD are maintained. If the signal θa has changed in the step 203, a computation is made to give a difference between the present value of the signal θa obtained during the present routine and the preceding value of the signal θa obtained in the preceding routine (in a step 205). As a result, the amount of depression of the accelerator pedal is obtained by this computation. After the amount of depression of the accelerator pedal has been obtained, the driving force versus vehicle speed characteristic (see FIG. 6) appropriate for the value of the depression degree is selected and determined (in a step 206). Subsequently, a finally desired driving force and a finally desired vehicle speed (Vf) are given by arithmetical operation using the selected and determined driving force/vehicle speed characteristic, and the values obtained are stored in the RAM 103 (in a step 207). The finally desired driving force and the finally desired vehicle speed are used to give the value of the engine power output which is to be finally desired, i.e., a finally desired engine power, from the data stored in the ROM 106 (in a step 208). After performing the arithmetical operation to provide the finally desired engine power output an arithmetical operation based on the finally desired engine power output is performed to obtain a finally desired throttle opening degree (θf), and this result is stored in the RAM 103, too (in a step 209). Next, an arithmetical operation based on the finally desired engine power output is performed using the data stored in the ROM 108 so as to obtain a finally desired engine speed. An arithmetical operation based on the finally desired engine speed and the finally desired vehicle speed is performed so as to give a finally desired reduction ratio which causes the engine to establish the finally desired engine speed, and this result is stored in the RAM 103, too (in a step 211). It will now be understood, in the process of steps 205 to 211, the values of the finally desired vehicle speed (Vf), the finally desired throttle opening degree (θf) and the finally desired reduction ratio (ic) are determined and stored in the RAM 103. These values which are to be finally desired are used in the control routine shown in FIG. 5, which is subsequently executed. Hereinafter, this control routine is described.

First of all, the signal θa indicative of the accelerator pedal depression degree is read (in a step 212), and a determination is made whether a change has taken place from the value of θa initially read (in a step 213). If the change in the value of the signal θa took place, the program goes back to the step 205 shown in FIG. 4 because the respective finally desired values need modification. If no change took place in the value of θa, the program goes to a step 214 where a computation is performed to give a change in the value of the desired driving force which corresponds to a change in vehicle speed (a change ΔV) during a predetermined time period. That is, the change in the desired driving force along the driving force pattern selected in the step 206 and stored in the ROM 105 as a result of changing the vehicle speed by the value ΔV is determined by the arithmetical operation. Next, a change ΔP in the value of the desired engine power output as a result of the change in the desired driving force is determined by arithmetical operation based on the data stored in the ROM 106 (in a step 215). Hereinafter, in the similar manner, a change Δθt in the value of the throttle opening degree command signal is determined by arithmetical operation in a step 216, a change ΔNE in the value of the desired engine speed is determined by arithmetical operation in a step 217, and a change ΔiD in the value of the reduction ratio command signal is determined by arithmetical operation in a step 218. Subsequently, the reduction ratio command signal, resulting from adding the change ΔiD to the value of the reduction ratio command signal obtained in the preceding routine, is produced (in a step 220). Next, the signal ir indicating the actual reduction ratio is read (in a step 221). Based on this signal ir indicating the actual reduction ratio, Δθt is corrected (in a step 222) to provide a corrected change Δθt' (namely, Δθt'=α·Δθt, where: α is a constant). Throttle opening degree command signal obtained in the preceding routine is modified with the corrected change Δθt' so as to provide a new throttle opening degree command signal (in a step 223). Subsequently, the program goes to a step 224 where a determination is made whether θr is equal to a sum of θ to and Δθt' (where: θr is an actual throttle opening degree, and θto is a throttle opening degree command signal obtained in the preceding routine), and also a determination is made whether ir is equal to a sum of iDo and ΔiD (where: ir indicates an actual reduction ratio, and iDo is an actual reduction ratio command signal obtained in the preceding routine). If the answer to the inquiry in the step 224 is NO, the program returns to the step 220 to repeat the same procedure. When the actual throttle opening degree θr and the actual reduction ratio ir become equal to the above values, respectively, after repeating the same procedure, the program goes to a step 225 where a determination is made whether the actual throttle opening degree θr and the actual reduction ratio ir become equal to the finally desired values θf and if, respectively. If they do not become equal to the finally desired values, the program returns to the step 212 to repeat the same procedure. When the actual throttle opening degree and the actual reduction ratio become the finally desired values, respectively, the program returns to the step 201.

Figure 7:
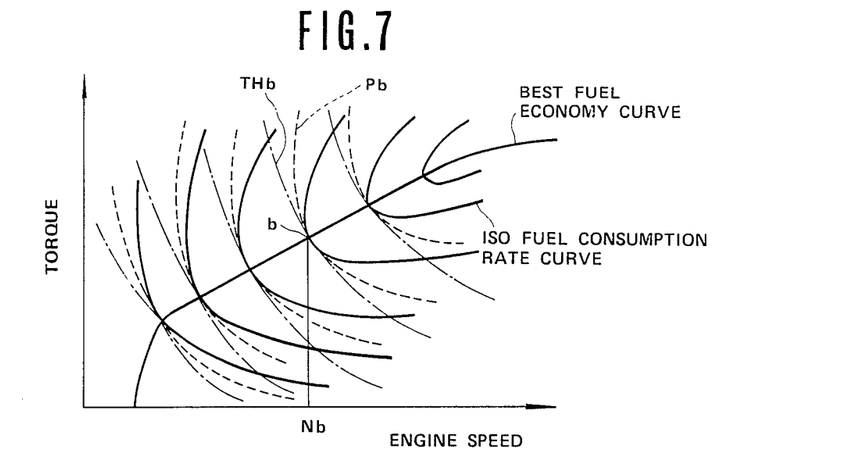
FIG. 7 is a graph showing the best fuel economy curve.

Hereinafter, the content of the control carried out under the above mentioned control procedure is described taking an actual running state as an example. Let it be assumed that the vehicle is travelling at a vehicle speed Vo in road load state (this state being illustrated by a point A in FIG. 6). At this point A, the accelerator pedal depression degree indicative signal θ2 is given. Assume now the accelerator pedal is depressed from this state to a new state indicated by a point B where the accelerator pedal depression degree indicative signal θn is given. The required driving force at the driving wheels changes from Ta to Tb, accordingly. In this case, the finally desired vehicle speed Vf becomes a vehicle speed corresponding to an intersection point F where the curve θn intersects with the road load curve R/L. At this point F, the finally desired driving force Tf is given. First, an arithmetical operation is performed to provide a desired engine power output which gives a driving force Tb at the point B. If the desired engine power output given by the arithmetical operation is plotted in a graph shown in FIG. 7 wherein the best fuel economy curve is expressed in terms of torque versus engine speed, it can be represented by the brokenline curves, only one being denoted by Pb. From this graph, the desired engine speed Nb is given at an intersection point b where the best fuel economy curve intersects with the curve Pb. Similarly, the desired throttle opening degree is determined singularly from that one THb of the throttle opening degree one-dot chain curves which passes through the intersection point b. After the desired engine speed Nb is determined in this manner, an arithmetical operation is performed to give a desired reduction ratio which gives this desired engine speed Nb. In response to this desired reduction ratio, the reduction ratio command signal is given to the reduction ratio actuator 30.

Referring to the throttle opening degree, the throttle opening degree command signal is given to the throttle actuator 24 in response to the desired throttle opening degree so as to cause the throttle actuator 24 to establish the desired throttle opening degree. However, the throttle opening degree command signal is corrected by the actual reduction ratio. Although the throttle actuator 24 can be highly responsive to the throttle opening degree command signal, a change in the actual reduction ratio in the continuously variable transmission is slightly delayed as compared to a change in the reduction ratio actuator 30. Thus, if the throttle actuator 24 and the reduction ratio actuator 30 were controlled independently, the operation point would deviate from the best fuel economy curve due to the difference in response speed. Therefore, what has been done to deal with this problem is to always use the actual reduction ratio indicative signal ir in effecting a correction so that the throttle opening degree command signal corresponding to this actual reduction ratio is produced. Since the control procedure as above is carried out after a predetermined interval, new desired values are determined by arithmetical operation every time a change in the vehicle speed takes place, and the reduction ratio and the throttle opening degree are controlled frequently in order to establish these new desired values. As a result, there are produced changes in the actual vehicle speed and driving force on and along the curve indicated by θn in FIG. 6 (i.e., the vehicle speed rises and the driving force decreases as the vehicle speed rises) without any deviation therefrom.

If the accelerator pedal depression degree varies continuously, an appropriate driving force pattern is selected which corresponds to the accelerator depression degree in every instance, and based on the selected driving force pattern, the desired throttle opening and the desired engine speed which are disposed on the best fuel economy curve are determined, and the throttle actuator 24 and reduction ratio actuator 30 are controlled so as to establish these desired values. Therefore, the throttle opening degree and the reduction ratio can be varied always on the best fuel economy curve.

Referring back to FIG. 1, the throttle actuator 24 may be replaced with a throttle actuator 300 which will be described hereinafter.

Figure 8:
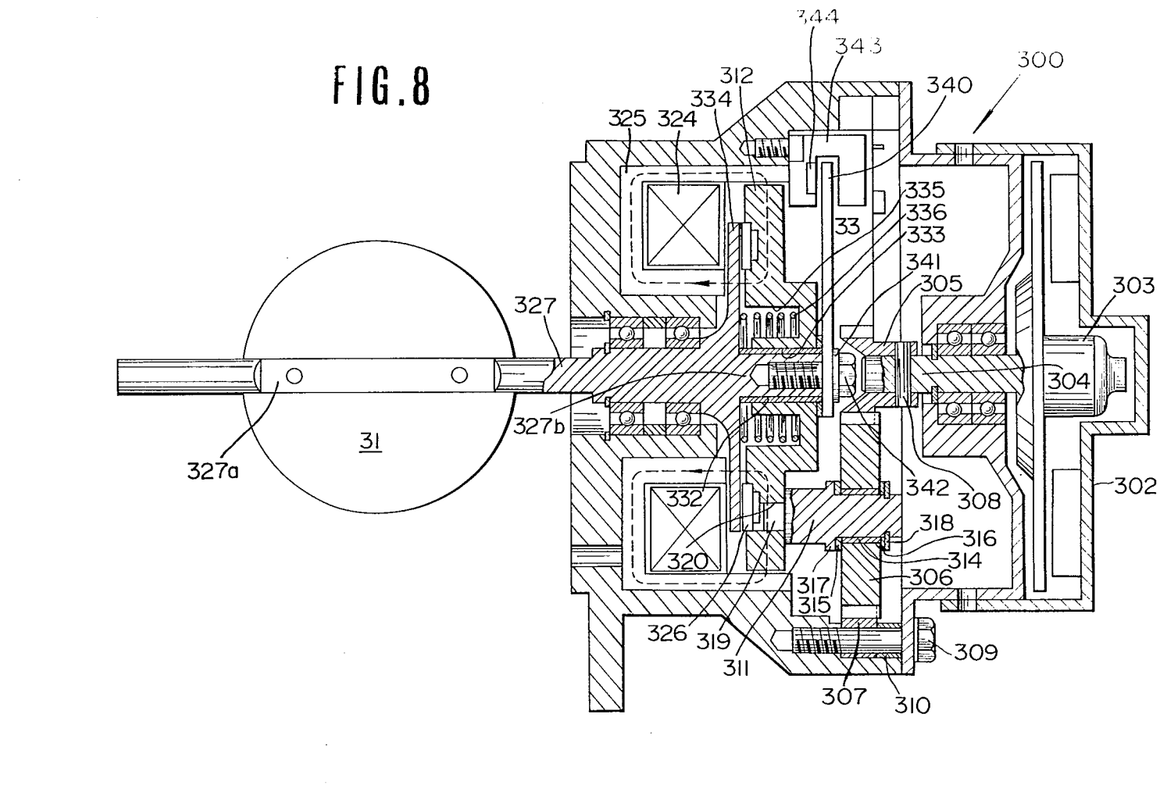
FIG. 8 is a longitudinal sectional view of an improved throttle actuator.
Figure 9:
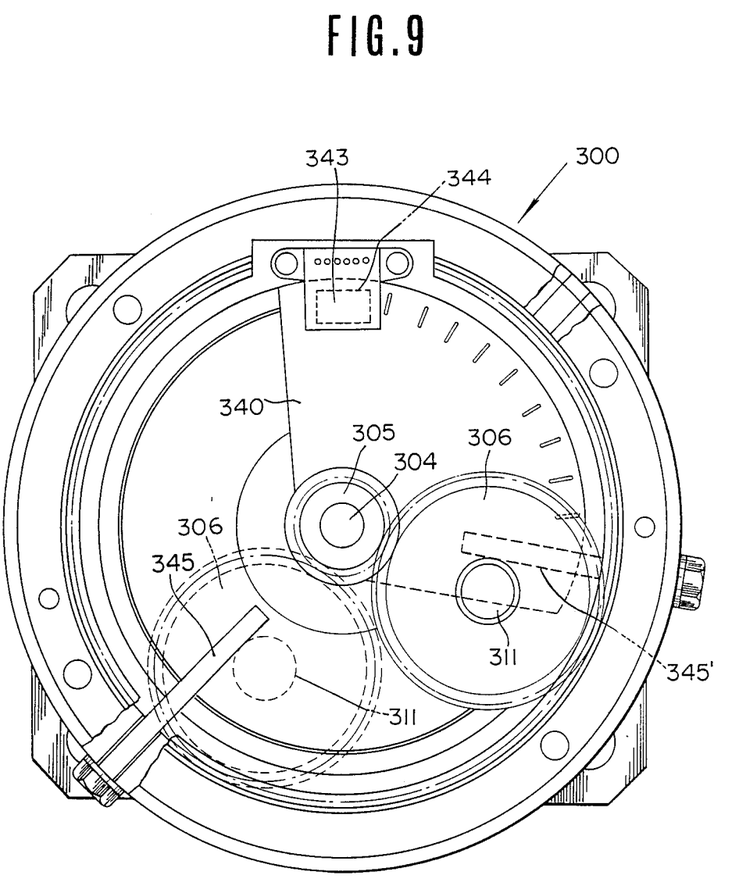
FIG. 9 is a cutaway view of the throttle actuator as viewed from the righthand side of FIG. 8.

Referring to FIGS. 8 and 9, the throttle actuator 300 comprises a housing 302 which fixedly supports a motor 303. A motor rotary shaft 304 of the motor 303 has a gear 305 fixed thereto with a lock pin 308. A gear 306 meshes with the gear 305 and another gear 307 and it rotates as the gear 305 rotates and at the same time orbits around the rotary shaft 304 of the motor 303. The gear 307 is fixed to the housing 302 by a bolt 309 and a fixer 310. These three gears 305, 306 and 307 cooperate with each other to form a planetary gear mechanism. There is provided a spindle 311, i.e., a shaft which transmits the rotation of the gear 306 to a rotor 312, which is rotatably inserted into a center hole of the gear 306 via a bearing 314 and axially fixed thereto by a stop 317 and a E-ring 318 via spacers 315 and 316, respectively. The spindle 311 has on its one end a projection 319 fixedly inserted into a recess 320 formed in the rotor 312 so as to rotate the rotor 312 as the spindle 311 orbits. The rotor 312, an electromagnetic coil 324 and a yoke 325 made of a magnetic material cooperate to form an electromagnetic clutch mechanism. The rotor 312 has mounted thereon a clutch facing 326. A throttle shaft 327 is rotatably supported by the housing 302 via a bearing 328 and it is axially fixed thereto by an E-ring 329 and a C-ring 330. The throttle shaft 327 has one end portion 327a attached to a throttle valve 31 and an opposite end portion 327b inserted in a center hole 333 of the rotor 312 via a bushing 332. The throttle shaft 327 has an integral clutch disc 334 facing the rotor 312 on its clutch facing 326. The rotor 312 is formed with a ring like groove 335 having attached therein a coil return spring 336. The coil return spring 336 having one end fixedly attached to the rotor 312 and an opposite end fixedly attached to the clutch disc 334 and is preloaded to bias the clutch disc 334 clockwise as viewed in FIG. 9 until the throttle value its fully closed position and the reaction created thereby causes the rotor 312 to be biased counterclockwise as viewed in FIG. 9. The reference numeral 340 denotes a slit plate attached to the throttle shaft 327 by a bolt 342 via a spacer 341 as illustrated. The reference numeral 343 denotes a photo interruptor composed of a semiconductive photo emitter and a semiconductive photo receiver. A rectangular slit plate 344 (see FIG. 10) is mounted on the photo interruptor 343 and formed with a single slit so as to prevent the scattering a light beam. The reference numerals 345, 345' denote stop pins, respectively, which are arranged to limit the rotational angle of the rotor 312.

The operation of the throttle actuator 300 constructed as above is described.

When an ignition switch, not shown, is turned OFF, the spindle 311 of the rotor 312 is prevented from rotating counterclockwise by the stop pin 345' as illustrated by the solid line in FIG. 9. In this position, the rotor 312 is subjected to the restoring force by the return spring 336 and thus is biased against the stop pin 345' with a force equal to the restoring force of the return spring 336. In this case, the throttle valve 31 assumes the fully closed position thereof and this closed state is maintained by the return spring 336. Since the electromagnetic clutch mechanism is in an OFF state thereof as the ignition switch is in its OFF state, the clutch disc 334 is disengaged from the clutch facing 326 of the rotor 312.

When the ignition switch is turned ON, the d.c. motor 303 is actuated to rotate clockwise as viewed in FIG. 9 under a command from the control unit 100. Rotation of the motor 303 is transmitted by the gear 305 fixed to the motor shaft 304 to the gear 306. Owing to the fact that the gear 306 meshes also with the gear 307, the gear 306 orbits around the motor shaft 304 clockwise as viewed in FIG. 9 while turning counterclockwise until it assumes a position as indicated by the phantom line in FIG. 9. When the spindle 311 has come to contact with the stop pin 345, the current supply to the motor 303 is cut off and then the current supply to the coil 324 is started, energizing the coil 324. The energization of the coil 324 causes the rotor 312 to be attracted toward the clutch disc 334, thereby bring the clutch facing 326 into contact with the clutch disc 334. During the above actuation process, the slit plate 340 attached to the throttle shaft 327 stays in the state as illustrated in FIG. 9 because the bushing 332 disposed between the rotor 312 and the throttle shaft 327 allows the rotor 312 to rotate relative to the throttle shaft 327. The throttle valve 31 remains in its fully closed state during the above described process of actuation. As described above, the electromagnetic clutch, when engaged, acts to establish a driving power transmitting path from the motor 303 to the throttle shaft 327.

According to the throttle actuator 300, the throttle shaft 327 will not vibrate in actuating the motor 303 to rotate the spindle 311 of the rotor 312 from the position as indicated by the fully drawn line in FIG. 9 to the position as indicated by the phantom line in FIG. 9 because the driving force of the motor 303 is not transmitted to the throttle shaft 327. Also, when the electromagnetic clutch is turned ON, the restoring force of the return spring 336 does not effect the driving force transmission system (, i.e., motor 303, gears 305, 306, 307, shaft 311, rotor 312).

Next, the ordinary operation of the throttle actuator 300 is described.

Owing to the initialization after the ignition switch has been turned ON, the spindle 311 of the rotor 312 assumes the position as indicated by the phantom line in FIG. 9. In this state, the throttle valve 31 is still fully closed. Opening of the throttle valve 31 is carried out by actuating the motor 303 with the electromagnetic clutch kept engaged. Describing more in detail, when the motor 303 is actuated to rotate, its driving force is transmitted to the gear 306 by the gear 305. Since the gear 306 meshes with the gear 307 also, it orbits around the rotary shaft 304 of the motor 303 while turning about its axis. The orbiting of the gear 306 causes the spindle 311 to orbit around the rotary shaft 304 (or around the throttle shaft 327). The orbiting of the spindle 311 causes the rotor 312 to rotate. Since the clutch disc 334 is kept engaged with the clutch facing 326, rotation of the rotor 312 causes the throttle shaft 327 to rotate, thereby to cause the throttle valve 31 to open to a desired position. When the throttle valve 31 has opened to the desired position, the current for actuating the motor 303 is cut off or disappears. Since the inertia from the gear 306 to the motor 303 is greater than the inlet manifold vacuum which the throttle valve 31 is subject to, the throttle valve 31 is prevented from fluttering. In the preceding, the actuation for opening the throttle valve 31 has been described, the actuation for closing the throttle valve is carried out in the similar manner.

Figure 10:
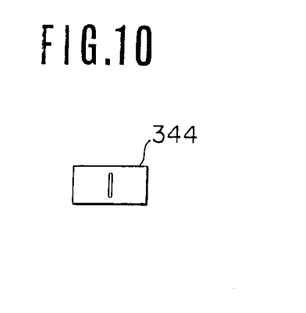
FIG. 10 is a plan view of a slit plate used in the throttle actuator shown in FIG. 8.

Referring to the slit plates 340 and 344 which cooperate with the photo interruptor 343 to form a throttle position sensor, they are manufactured in the same manner as commercially available ones used in rotary encoders are manufactured. They may be manufactured by vacuum evaporating a metal, such as a chronium, on a glass or blanking a stainless plate. The slit plate 340 is so arranged that slits thereof are adapted to pass the light axis of the photo interruptor 343. When the slit plate 340 interrupts the light axis of the photo interruptor 343, the output signal of the photo interruptor 343 changes, and this change is detected and processed so as to detect the position assumed by the throttle valve 31.

The electromagnetic clutch of the throttle actuator 24 exhibits a fail-safe function in cooperation with the return spring 336. Next, this fail-safe function is described.

In the event it is necessary to close the throttle valve 8 under the circumstances where the normal open/close action of the throttle valve 31 by the motor 303 is not possible as a result of the occurrence of abnormal event in the control system of the automotive vehicle, the current to the coil 324 is cut off, thereby to disengage the clutch disc 334 from the rotor 312. Under this condition, the return spring 336 built between the clutch disc 334 and the rotor 312 is put into an action thereby to bring the throttle valve 8 into its fully closed state owing to the restoring force of the spring 336. During this action, the throttle shaft 327 is allowed to rotate relative to the rotor 312 due to the provision of the bushing 332. In this case, the return spring 336 exhibits a restoring force large enough to prevent the throttle valve 31 from fluttering owing to the inlet manifold vacuum. In the process of bringing the throttle valve 31 into the fully closed state after the electromagnetic clutch is turned OFF, the restoring force of the return spring 336 does not affect the driving power transmitting system until it closes the throttle valve 31 because the driving power transmitting system from the gear 306 to the motor 303 has sufficiently large inertia. However, after the throttle valve 31 is closed, the restoring force of the return spring 336 affects on the driving power transmitting system, thereby to bring the throttle actuator 24 to assume the position as indicated by the fully drawn line shown in FIG. 9. The throttle actuator 300 can resume its ordinary working state after the removal of fail-safe causes. The throttle actuator 300 will assume the fully drawn position as shown in FIG. 9 irrespective of its working state when the ignition switch is turned OFF.

Although, a print motor is used as the motor 303 in the case of FIGS. 8 and 9, it is not necessary to limit to this type of motor and other motors of various types may be used such as a DC motor, an AC motor, and a stepper motor.

Referring briefly to the signal processing to detect the throttle position, if the throttle valve 31 is opened from the fully closed position to a desired opening degree, zero degree (0°) is set when the spindle 311 is in the position illustrated by the phantom line in FIG. 9 and the output signal from the throttle position sensor (343, 340, 344) is added (count-up) one after another until the throttle valve 31 assumes the desired opening degree. If the throttle valve 31 is opened from one opening degree to another opening degree, the output signal from the throttle position sensor may be added one after another (count-up). Alternatively, zero degree (0°) may be set when the throttle valve 31 assumes the one opening degree and the output signal from the throttle position sensor is added one after another (count-up) until the throttle valve 31 assumes the another opening degree.

If it is desired to detect the direction of rotation of the throttle valve 31, it can be detected by detecting the driving signal or current supplied to the motor 303.

Figure 11:
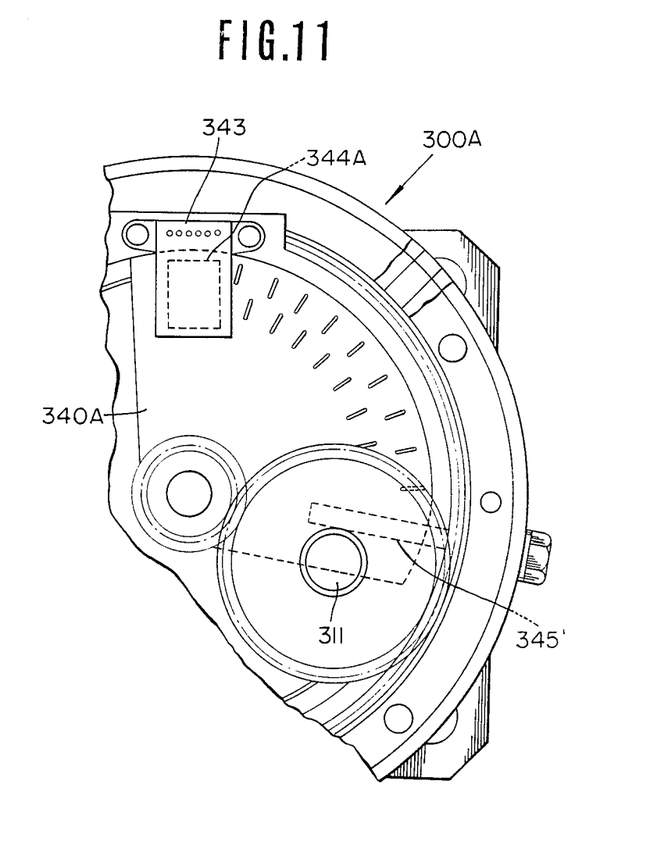
FIG. 11 is a fragmentary view of FIG. 9 showing a modified throttle position sensor.
Figure 12:
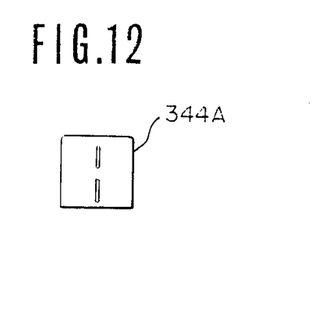
FIG. 12 is a plan view of a slit plate used in FIG. 11.

The direction of rotation of the throttle valve 31 may be detected by replacing the slit plates 340, 344 with a slit plate 340A and a slit plate 344A as shown in FIGS. 11 and 12. The slit plate 340A is different from the slit plate 340 in that outer and inner rows of slits are formed. The arrangement is such that each of the slits of the inner row is equidistant in angular direction from the adjacent two slits of the outer row. The slit plate 344A is different from the slit plate 344 in that outer and inner slits are formed as best seen in FIG. 12. The throttle position sensor employing these slit plates 340A and 344A generates two output signals with 90° phase difference. By suitably processing the two output signals, the direction in rotation of the throttle valve 31 can be detected.

What is claimed is:

1. A control system for a vehicle having an accelerator pedal, an engine and a continuously variable transmission, the engine having a throttle valve which has a fully closed position and opens in degrees away from the fully closed position, comprising:
    an accelerator sensor means for detecting a depression degree of the accelerator pedal and generating an accelerator pedal depression degree indicative signal;
    a vehicle speed sensor means for detecting a vehicle speed of the vehicle and generating an actual vehicle speed indicative signal indicative of the vehicle speed detected;
    a driving force pattern determining means for determining a pattern of variation of driving force against vehicle speed for the accelerator pedal depression degree indicative signal and the actual vehicle speed indicative signal and using the pattern to determine a desired driving force to be given to a driving wheel of the vehicle and generating a desired driving force indicative signal;
    a desired vehicle speed determining means for using said pattern to determine a desired vehicle speed corresponding to the desired driving force and generating a desired vehicle speed indicative signal;
    a desired engine power output computing means for performing a computation based on the desired driving force indicative signal and the desired vehicle speed indicative signal so as to give a desired engine power output which is to be produced by the engine and generating a desired engine power output indicative signal;
    a desired throttle opening degree determining means for determining a desired throttle opening degree based on the desired engine power output indicative signal and generating a desired throttle opening degree indicative signal;
    a throttle control means for generating a throttle opening degree command signal based on the desired throttle opening degree indicative signal;
    a desired engine speed determining means for determining a desired engine speed based on the desired engine power output indicative signal;
    a desired reduction ratio arithmetical operation means for performing an arithmetical operation based on the desired engine speed indicative signal and the desired vehicle speed indicative signal so as to give a desired reduction ratio and generating a desired reduction ratio indicative signal;
    a reduction ratio control means for generating a reduction ratio command signal based on the desired reduction ratio indicative signal;
    a throttle actuator means operatively connected to the throttle valve for opening the throttle valve in response to the throttle opening degree command signal; and
    a reduction ratio actuator means for controlling an actual reduction ratio in the continuously variable transmission in response to the reduction ratio command signal.

2. A control system as claimed in claim 1, wherein the throttle control means corrects the throttle opening degree command signal in response to a signal indicative of the actual reduction ratio.

3. A control system as claimed in claim 1, wherein said throttle actuator means comprises:
    a housing;
    a drive motor fixedly mounted within the housing and having a rotary shaft;
    a planetary gear mechanism including a first gear fixed to the rotary shaft of the drive motor, a second gear fixed to said housing and a third gear meshing with the first and second gears and urged to rotate by the rotation of the first gear while orbiting around the rotary shaft of said drive motor;
    a rotor operatively coupled to the third gear so as to let the orbiting movement of the third gear be transmitted thereto;
    an electromagnetic clutch mechanism having an electromagnetic coil and a yoke made of an electromagnetic material;
    a throttle shaft connected to the throttle valve for rotation therewith toward the fully closed position and away therefrom and having an integral clutch disc arranged to face said rotor;
    a return spring arranged between the rotor and the clutch disc, said return spring being preloaded to bias the throttle shaft in one rotational direction into the fully closed position of the throttle valve and thus cause the rotor to be biased in the opposite rotational direction; and
    a sensor including a slit plate with a plurality of slits and attached to the throttle shaft;
    said electromagnetic clutch being constructed and arranged such that the rotor is engaged with the clutch disc for rotation therewith when the electromagnetic coil is energized.

4. A control system as claimed in claim 3, wherein the restoring force of the return spring is stored between the rotor and the clutch disc when the electromagnetic coil is energized, while it acts on the throttle shaft when the electromagnetic coil is deenergized, thus biasing the throttle valve in the one rotational direction into its fully closed position before the reaction forces the rotor in the opposite direction.

5. A control system as claimed in claim 3, wherein there is provided a fail-safe function that upon occurrence of the event which requires fail-safe function in the vehicle, the restoring force of said return spring closes the throttle valve.

6. A control method for a vehicle having an accelerator pedal, an engine and a continuously variable transmission, the engine having a throttle valve which opens in degrees, comprising:
    detecting a depression degree of the accelerator pedal and generating an accelerator pedal depression degree indicative signal;
    detecting a vehicle speed of the vehicle and generating an actual vehicle speed indicative signal indicative of the vehicle speed detected;
    preparing and storing various patterns of variations of driving force against vehicle speed, each of the patterns being predetermined for one of various depression degrees of the accelerator pedal;

retrieving the various patterns based on the accelerator pedal depression degree indicative signal and the vehicle speed indicative signal and determining one of the various patterns which is fit for the accelerator pedal depression degree indicative signal and the vehicle speed indicative signal;

determining a desired driving force to be given to a driving wheel of the vehicle using the one pattern determined and generating a desired driving force indicative signal;

determining a desired vehicle speed corresponding to the desired driving force using the one pattern determined and generating a desired vehicle speed indicative signal;

performing a computation based on the desired driving force indicative signal and the desired vehicle speed indicative signal so as to give a desired engine power output which is to be produced by the engine and generating a desired engine power output signal;

determining a desired throttle opening degree based on the desired engine power output indicative signal and generating a desired throttle opening degree indicative signal;

generating a throttle opening degree command signal based on the desired throttle opening degree indicative signal;

determining a desired engine speed based on the desired engine power output indicative signal and generating a desired engine speed indicative signal;

performing an arithmetical operation based on the desired engine speed indicative signal and the desired vehicle speed indicative signal so as to give a desired reduction ratio and generating a desired reduction ratio indicative signal;

generating a reduction ratio command signal based on the desired reduction ratio indicative signal;

opening the throttle valve in response to the throttle opening degree command signal; and controlling an actual reduction ratio in the continuously variable transmission in response to the reduction ratio command signal.

7. A throttle actuator for an internal combustion engine comprising;
 a throttle valve for the internal combustion engine which has a fully closed position and opens in degrees away from the fully closed position thereof;
 a housing;
 a drive motor fixedly mounted within the housing and having a rotary shaft;
 a planetary gear mechanism including a sun gear fixed to the rotary shaft of the drive motor, a ring gear fixed to said housing, and a carrier rotatably supporting a planet gear meshing with the sun and ring gears;
 a rotor operatively coupled to said carrier for rotation therewith;
 an electromagnetic clutch mechanism having an electromagnetic coil and a yoke made of an electromagnetic material;
 a throttle shaft connected to the throttle valve for rotation therewith;
 a return spring means for biasing the throttle shaft and the throttle valve in one rotational direction toward the fully closed position and biasing said rotor in the opposite rotational direction due to a reaction force created after the throttle valve has been biased into the fully closed position thereof;
 the electromagnetic clutch mechanism also having a clutch disc integral with the throttle shaft and arranged to face said rotor;
 said return spring means being disposed between the rotor and the clutch disc and acting on the rotor and the clutch disc; and
 said electromagnetic clutch being constructed and arranged such that the rotor is engaged with the clutch disc for rotation therewith when the electromagnetic coil is energized.

8. A throttle actuator as claimed in claim 7, further comprising a sensor including a slit plate attached to the throttle shaft, said slit plate being formed with a plurality of slits, the sensor further including a photo interruptor fixedly mounted to the housing and operatively coupled to the slit plate.

9. A control method for a vehicle having an accelerator pedal, an engine and a continuously variable transmission, the engine having a throttle valve which opens in degrees, comprising:
 detecting a depression degree of the accelerator pedal and generating an accelerator pedal depression degree indicative signal;
 detecting a vehicle speed of the vehicle and generating an actual vehicle speed indicative signal indicative of the vehicle speed detected;
 preparing and storing various patterns of variations of driving force against vehicle speed, each of the patterns being predetermined for one of various depression degrees of the accelerator pedal;
 retrieving said various patterns stored based on said accelerator pedal depression degree indicative signal and said vehicle speed indicative signal and determining one of said various patterns which is fit for said accelerator pedal depression degree indicative signal and said vehicle speed indicative signal;
 using said one pattern to determine a desired driving force to be given to a driving wheel of the vehicle and generating a desired driving force indicative signal;
 using said one pattern to determine a desired vehicle speed corresponding to said desired driving force indicative signal and producing a desired vehicle speed indicative signal;
 performing a computation based on said desired driving force indicative signal and said desired vehicle speed indicative signal to give a desired engine power output which is to be produced by the engine and generating a desired engine power output indicative signal;
 determining a desired throttle opening degree based on said desired engine power output indicative signal and generating a desired throttle opening degree indicative signal;
 generating a throttle opening degree command signal based on said desired throttle opening degree indicative signal;
 determining a desired engine speed based on said desired engine power output indicative signal and generating a desired engine speed indicative signal;
 performing an arithmetical operation based on said desired vehicle speed indicative signal so as to give a desired reduction ratio and generating a desired reduction ratio indicative signal;
 generating a reduction ratio command signal based on said desired reduction ratio indicative signal;

opening the throttle valve in response to said throttle opening degree command signal;

controlling an actual reduction ratio in the continuously variable transmission in response to said reduction ratio command signal;

detecting an actual reduction ratio in the continuously variable transmission and generating an actual reduction ratio indicative signal indicative of the actual reduction ratio detected; and correcting said reduction ratio command signal in response to said actual reduction ratio indicative signal.

10. A method as claimed in claim 9, wherein said throttle opening degree generating step includes a step of correcting said throttle opening degree indicative signal in response to a difference between said actual vehicle speed indicative signal and said desired vehicle speed indicative signal after a change in said accelerator pedal depression degree indicative signal;

said reduction ratio command signal generating step includes a step of correcting said reduction ratio command signal in response to said change in said actual vehicle speed indicative signal after said change in said accelerator pedal depression degree indicative signal.

* * * * *